United States Patent [19]

Fishter et al.

[11] E Patent Number: Re. 31,823

[45] Reissued Date of Patent: Feb. 5, 1985

[54] CHEMICAL MILLING OF HIGH TUNGSTEN CONTENT SUPERALLOYS

[75] Inventors: Robert E. Fishter, Boca Raton; Henry Lada; Brian A. Manty, both of Lake Park, all of Fla.

[73] Assignee: United Technologies Corporation, Hartford, Conn.

[21] Appl. No.: 540,933

[22] Filed: Oct. 11, 1983

Related U.S. Patent Documents

Reissue of:

[64] Patent No.: 4,353,780
Issued: Oct. 12, 1982
Appl. No.: 192,667
Filed: Oct. 1, 1980

[51] Int. Cl.[3] ..... C23F 1/00; C09K 13/08

[52] U.S. Cl. ..... 156/664; 156/639; 156/640; 156/651; 156/659.1; 252/79.3

[58] Field of Search ..... 156/664, 628, 634, 638, 156/639, 640, 641, 651, 654, 656, 659.1; 252/79.3; 134/1

[56] References Cited

U.S. PATENT DOCUMENTS

| | | | |
|---|---|---|---|
| 2,916,458 | 12/1959 | McFarland | 252/79.3 X |
| 2,940,837 | 6/1960 | Acker et al. | 156/664 |
| 3,052,582 | 9/1962 | Snyder | 156/664 |
| 3,057,765 | 10/1962 | LaBoda et al. | 156/664 |
| 3,622,391 | 11/1971 | Baldi | 252/142 X |
| 4,274,908 | 6/1981 | Fishter et al. | 156/664 X |
| 4,284,468 | 8/1981 | Stearns | 252/79.3 X |

*Primary Examiner*—Edward Kimlin
*Assistant Examiner*—Thomas Bokan
*Attorney, Agent, or Firm*—C. G. Nessler

[57] ABSTRACT

Chemical milling of cast superalloys having high tungsten contents is advantageously accomplished with an etchant which consists by volume percent of 40–60 concentrated $HNO_3$, 0.6–0.8 concentrated HF, [30] *40*–70 $H_2O$, with which is included at least 0.008 moles/liter $CuSO_4$ and 0.0016–0.025 moles/liter $FeCl_3$. Preferably the molar ratio of $CuSO_4$ to $FeCl_3$ is 2:1 and etching is accomplished in the range 50°–80° C.

5 Claims, 6 Drawing Figures

CHEMICAL MILLING OF HIGH TUNGSTEN CONTENT SUPERALLOYS

Figure 1:
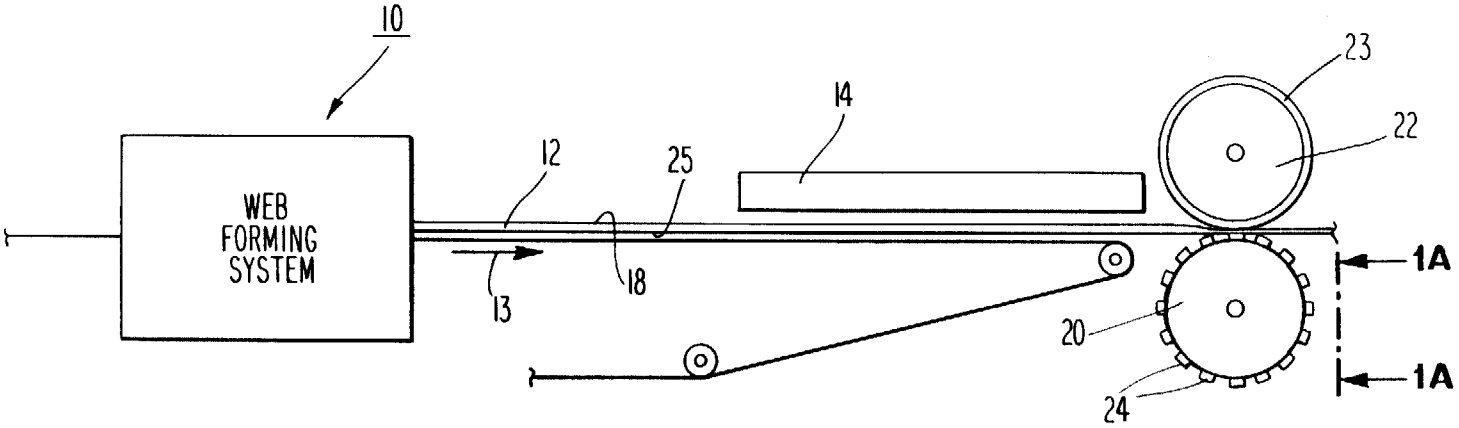
Figure 1A:
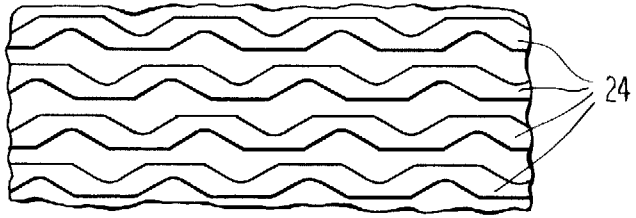

Matter enclosed in heavy brackets [ ] appears in the original patent but forms no part of this reissue specification; matter printed in italics indicates the additions made by reissue.

DESCRIPTION

Background Art

1. The present invention relates to chemical milling of superalloys, particularly those with high tungsten content. 2. Chemical milling is a convenient method for removing material generally or selectively from difficult to machine superalloys used in gas turbine engines. However, since such materials are created to be corrosion resistant, very powerful etchants must be used. Further, cast superalloys tend to have multiple phases of different composition and areas of segregation. Thus, etchants may preferentially attack particular regions and produce undesirable roughness or surface pitting. When the attack is preferential toward the grain boundaries, a highly undesirable and weakened structure will result. There are of course a multiplicity of nickel-base alloys having varying compositions, as reference to any materials handbook will show. Some are adapted to providing corrosion resistance at particular temperatures, others high strengths at high temperatures, still others high ductilities, others are designed to provide formability, weldability, etc. In the temperature corrosion phenomenon characterized as chemical etching, varying behavior is exhibited amongst the alloys of varied chemistries. In chemical milling the object is to provide the most rapid material removal for economic reasons, while avoiding deleterious effects on the workpiece. Therefore careful attention is necessarily given to the choice of etchant for any given superalloy.

Alloys which contain substantial amounts of tungsten have been found to be particularly resistant to good chemical milling. Tungsten is known to be an element which is relatively resistant to chemical attack at low temperatures. When conventional chemical milling solutions are used uneven surface finishes result. If unduly powerful etchants are used to overcome the tungsten rich areas, then intergranular and other adverse localized attack of less resistant phases occurs.

SUMMARY OF INVENTION

It is an object of the invention to provide a means for chemically milling nickel-base alloys having high tungsten content.

According to the invention, chemical milling of alloys with large amounts of tungsten (greater than 6 weight percent) is carried out using an etchant consisting by volume percent of 40–60 concentrated $HNO_3$, 0.6–0.8 concentrated HF, [30] *40*–70 $H_2O$, and with which is included at least 0.008 moles/liter $CuSO_4$ and 0.0016–0.025 moles/liter $FeCl_3$. Preferably the molar ratio of $CuSO_4$ to $FeCl_3$ is maintained at about 2:1. A most preferred solution is comprised of about 50 percent $HNO_3$, 0.6 percent HF, 50 percent $H_2O$, 0.008 moles/liter $CuSO_4$, 0.004 moles/liter $FeCl_3$. Preferably milling is carried out at 50°–80° C.

The invention provides uniform and predictable material removal from the surfaces of alloys such as MAR M-200, where high concentrations of elemental tungsten are present.

BEST MODE FOR CARRYING OUT THE INVENTION

The invention was developed for and is described in terms of the cast nickel-base superalloy MAR M-200 which has the composition by weight percent of 10Co, 9Cr, 2Ti, 5Al, 12W, 1Cb, 0.15C, 0.015B, 0.05Zr, balance Ni. Because of its high tungsten content, this alloy is relatively unique amongst the general families of cast nickel-base alloys and wrought precipitation hardenable nickel-base alloys which are usable at the high temperatures experienced in gas turbine engines. By way of example, such familar alloys as B-9100, IN-100, INCONEL alloys 600, 625, 713, and 718, NX-188, UDIMET 500, UDIMET 700 and Waspaloy all have no tungsten content. Among the few common nickel superalloys having significant tungsten are INCONEL 738 (2.5%), INCONEL 792 (3.8%), Rene 95 (3.5%), UDIMET 630 (6%), MAR M-211 (5.5%), AF2-IDA (6%), Nicrotung (8%), MAR M-246 (10%), MAR M-200 (12%), and WAZ-20 (18.5%). The invention herein is peculiarly useful on alloys containing high amounts of tungsten; by this is meant alloys having 6 weight percent tungsten or more.

The requirement which led to the making of the invention described hereafter was to remove material from the contoured surface of a MAR M-200 workpiece in a relatively uniform manner. Chemical milling was used because it was an efficient process to accomplish this task, compared to the complexities of any mechanical means for following a contoured surface with a tool. The invention will also be found usable in instances where patterns are desired to be etched on the surface of a workpiece, in which case the workpiece will be selectively masked.

When MAR M-200 nickel-alloy is cast there is a natural segregation and formation of different phases during the solidification process, a characteristic shared to varying degrees with many other superalloys. In MAR M-200 the tungsten exhibits an unusually high degree of segregation and is found to be concentrated in elemental form as filamentary structures in the center of dendrites. Thus when an ordinary chemical milling etchant such as 2 v/o (volume percent) $HNO_3$, 80 v/o HCl, 11 v/o $H_2O$, 1.0 mole/l $FeCl_3$ was used, it proved most unsatisfactory. The chemical milling rates were unpredictable and the alloy removal was uneven from point to point across the material surface. When another chemical milling solution, 40 v/o $HNO_3$, 2 v/o HF, 58 v/o $H_2O$ was applied to the surface it produced preferential attack of the grain boundaries.

After experiment it was determined that the following etchant, heated to 75° C., was effective in uniformly and rapdily removing material from the surface of a MAR M-200 cast workpiece:

| | | |
|---|---|---|
| HF, concentrated 70% | 25 ml | (0.6 v/o) |
| $HNO_3$, concentrated (69–71%) | 1890 ml | (50 v/o) |
| $H_2O$ | 1890 ml | (50 v/o) |
| $CuSO_4$ | 5 gm | (0.008 moles/liter) |
| $FeCl_3$ | 2.5 gm | (0.004 moles/liter) |

The MAR M-200 article was immersed in the etchant for about 30 minutes, removed, cleaned ultrasonically in deionized water to remove smut, weighed and dimensioned, and returned to the etchant until a total time in the etchant of 120 minutes was reached. It was found that 0.17 mm of material was removed from the surface, at an average rate of 0.0014 mm per minute. The periodic measuring showed the removal rate was uniform over the increments of the 120 minutes time of immersion, thus evidencing a desirable characteristic that enables predictably removing predetermined amounts from a surface. Other experiments indicate that removal will be generally linear with time even without the periodic cleansing. Examination of the milled workpiece revealed a smooth surface without significant selective attack of different phases or the grain boundaries.

Based on further experiment, the foregoing preferred composition may be varied from the nominal values within reasonable ranges while still carrying out the objects of the invention. The range which we believe to be operable is as follows:

HF, conc. (70[&]%): [0.3] *0.6* to 0.8% v/o $HNO_3$, conc. (69-71%): 40 to 60% v/o $H_2O$: [30] *40* to 70% v/o $CuSO_4$: 0.008 to 0.08 moles/l $FeCl_3$: 0.0016 to 0.025 moles/l It is seen that our etchant is basically an aqueous solution comprised of nitric acid together with a smaller quantity of hydrofluoric acid. The diluent water is necessary in the minimum of the range we indicate to avoid preferential surface attack. More dilution than the maximum we indicate may be employed if it is desired to decrease the rate of removal. However too much dilution, e.g. doubling and maximum above, will render the etchant inoperable, as the etching action will be reduced to the point that long times for material removal will result. An elevated temperature is used to accelerate the rate of chemical milling; the range of 50° to 80° C. is preferred.

In our etchant we include ferric chloride as an additional corrodent in combination with copper sulfate; the latter acts an an inhibitor on the action which the former has on the superalloy grain boundaries. If the superalloy is immersed in the $HF/HNO_3$ aqueous solution without the additives, pitting and uneven attack result. The addition of $FeCl_3$ increases the rate of attack, but also results in more pitting. The addition of $CuSO_4$, preferably at a molar ratio of 2:1 with the $FeCl_3$, inhibits pitting and grain boundary attack. Greater amounts of $CuSO_4$ beyond the indicated range may be included but are found to be benign. However, even with the presence of the $CuSO_4$ the quantity of $FeCl_3$ should not exceed 50 gm/l (0.4 moles/liter), since the inhibitory effect of $CuSO_4$ will be overcome, regardless of the amount present.

We believe our composition to be novel: for example U.S. Pat. No. 2,940,837 to Acker et al. discloses a nitric acid and hydrochloric acid etchant in which is included ferric chloride. Similarly U.S. Pat. No. 3,057,765 to La Boda et al. discloses a solution for etching nickel-base superalloys using a solution containing hydrochloric acid and nitric acid together with ferric chloride and antimony trichloride. U.S. Pat. No. 3,622,391 to Baldi discloses that a solution containing up to 5% hydrofluoric acid together with 3-20% nitric acid is usable as a solution for stripping nickel alumide coatings from superalloys because it will not attack the nickel or cobalt-base superalloys.

In the U.S. Pat. No. 4,274,908, we disclose the use of 30-60 nitric acid, with copper sulfate and ferric chloride, for removing gold-nickel braze from nickel superalloys. The solution does not attack nickel base metal, including the alloy MAR M-200. The particular combination of ingredients which we disclose is uniquely suited for uniformly etching high tungsten superalloys, which our experiments indicate, will not be as effectively accomplished by the prior art solutions.

Based on the similar electrochemical behavior of nickel and cobalt, we believe that our etchant compositions will be used in etching high tungsten concentration cobalt-base alloys as well. Included within these are the familar alloys (with tungsten content indicated) WI-52 (11%), MAR M-302 (10%), Stellite 31 (7.5%) and MAR M-509 (7%).

While chemical milling is preferably carried out by immersion as we described it, our etchant also may be used as a spray and in other modes of applications used by those in the practice of chemical milling. The patents mentioned above describe the use of various wetting agents, thickners, and other techniques; we believe that these techniques will be usable with our invention as well, as the user is inclined. Also, when masking portions of the surface is desired, such as when a pattern of grooves is to be produced, an ordinary resist such as Hunts Waycoat will be usable with our etchant.

Although this invention has been shown and described with respect to a preferred embodiment, it will be understood by those skilled in the art that various changes in form and detail thereof may be made without departing from the spirit and scope of the claimed invention.

We claim:

1. The method of chemical milling a superalloy having a base metal selected from the group consisting of nickel and cobalt, and a tungsten content of greater than 6 weight percent, which comprises the use of the etchant consisting essentially by volume percent of 40-60 concentrated $HNO_3$, [0.3-0.8] *0.6-0.8* concentrated HF, and [30] *40*-70 $H_2O$, together with at least 0.008 moles/liter $CuSO_4$ and 0.0016-0.025 moles/liter $FeCl_3$.

2. The method of claim 1 wherein $CuSO_4$ is less than [0.083] *0.08* moles/liter.

3. The method of claim 1 wherein the etchant has the composition consisting essentially by volume of about 50 percent $HNO_3$, 0.3 percent HF, and 50 percent $H_2O$, with 0.008 moles/liter $CuSO_4$ and 0.004 moles/liter $FeCl_3$.

4. The method of claims 1 or 2 wherein the molar proportion of $CuSO_4$ [and] *to* $FeCl_3$ is about 2:1.

5. The method of claim 1 wherein the superalloy composition consists essentially by weight percent of 10Co, 9Cr, 2Ti, 5Al, 12W, 1Cb, 0.15C, [0.01B] *0.015B*, 0.05Zr.

* * * * *

UNITED STATES PATENT AND TRADEMARK OFFICE

CERTIFICATE OF CORRECTION

PATENT NO. : RE.31,823

DATED : February 5, 1985

INVENTOR(S) : Robert E. Fisher et al.

It is certified that error appears in the above-identified patent and that said Letters Patent is hereby corrected as shown below:

On the title page, the illustrative figure should be deleted.

Figure 2:
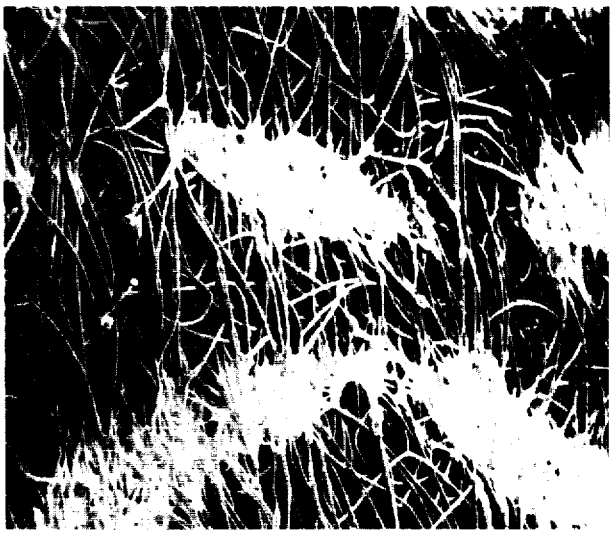
Figure 3:
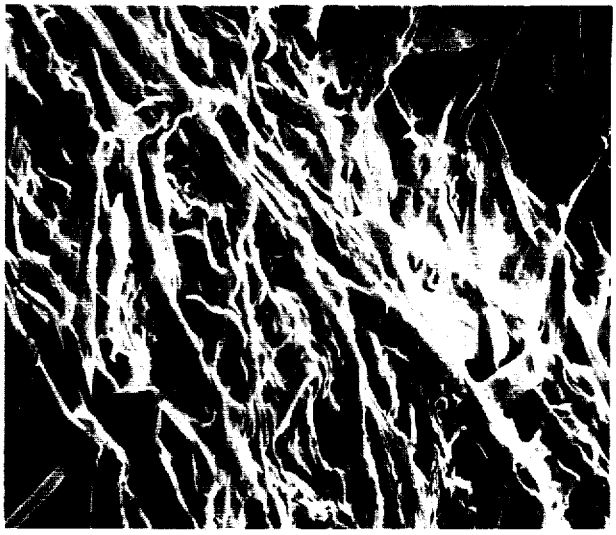
Figure 4:
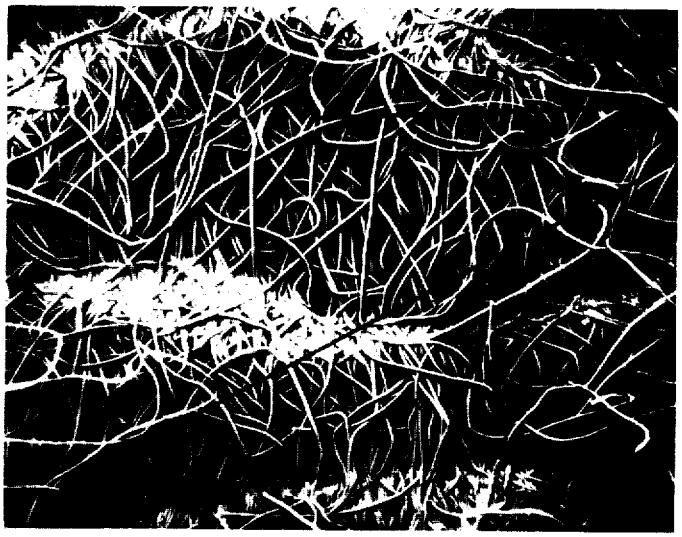
Figure 5:
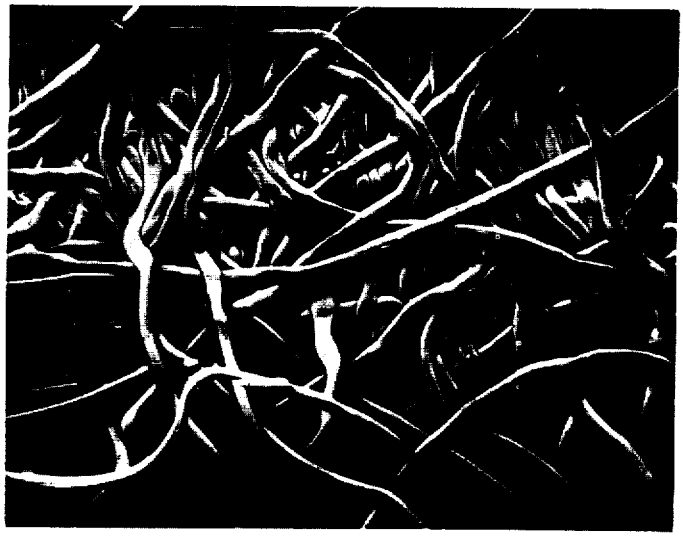

Sheets 1 to 3 consisting of Figs. 1 to 6 should be deleted.

On the title page, "5 Claims, 6 Drawing Figures" should read -- 5 Claims, No Drawings --.

Signed and Sealed this

*Third* Day of *December 1985*

[SEAL]

*Attest:*

DONALD J. QUIGG

*Attesting Officer*

*Commissioner of Patents and Trademarks*